United States Patent
Matthews et al.

(10) Patent No.: US 11,706,063 B2
(45) Date of Patent: Jul. 18, 2023

(54) TIME DIVISION PHYSICAL LAYER ACCESS FOR NETWORK COMMUNICATIONS

(71) Applicant: Landis+Gyr Innovations, Inc., Alpharetta, GA (US)

(72) Inventors: Justin Clifford Matthews, Arncliffe (AU); Michael Sean Holcombe, Roswell, GA (US); Christopher Scott Hett, Sandy Springs, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 286 days.

(21) Appl. No.: 17/157,123

(22) Filed: Jan. 25, 2021

(65) Prior Publication Data

US 2022/0240345 A1 Jul. 28, 2022

(51) Int. Cl.
*H04L 27/00* (2006.01)
*H04W 84/18* (2009.01)

(52) U.S. Cl.
CPC ......... *H04L 27/0012* (2013.01); *H04W 84/18* (2013.01)

(58) Field of Classification Search
CPC ... H04L 5/0044; H04L 27/0012; H04L 27/10; H04L 27/2601; H04W 84/18
See application file for complete search history.

(56) References Cited

U.S. PATENT DOCUMENTS

| | | | |
|---|---|---|---|
| 2005/0111397 A1 | 5/2005 | Attar et al. | |
| 2012/0147814 A1* | 6/2012 | Valbonesi | H04L 27/10 370/328 |
| 2020/0275453 A1* | 8/2020 | Matthews | H04L 5/0055 |

FOREIGN PATENT DOCUMENTS

EP 3697001 8/2020

OTHER PUBLICATIONS

Prism Model Checker, "IEEE 802.15.4 CSMA-CA Protocol (ZigBee)", Aug., 8, 2020, retrieved from Wayback Machine, https://web.archive.org/web/20200808232831/https://www.prismmodelchecker.org/casestudies/zigbee.php, 6 pages. (Year: 2020).*
International Application No. PCT/US2022/013038, International Search Report and Written Opinion dated May 2, 2022, 13 pages.

* cited by examiner

*Primary Examiner* — Hoon J Chung
(74) *Attorney, Agent, or Firm* — Kilpatrick Townsend & Stockton LLP

(57) ABSTRACT

A system for switching between different communication modes by network nodes according to a time-division schedule to transmit and receive data packets is provided. For example, a transmitting node is configured to determine a scheduled communication mode of an upcoming time division according to a time-division schedule, and transmit a data packet in that time division when the scheduled communication mode matches a selected communication mode supported by both the transmitting node and a receiving node. The receiving node operates in a scheduled communication mode specified for a current time division by the time-division schedule and determines whether a header of the data packet is detected in the current time division. If not, the receiving node switches to a second scheduled communication mode specified for the subsequent time division by the time-division schedule to detect the header of the data packet in a subsequent time division.

17 Claims, 7 Drawing Sheets

TIME DIVISION PHYSICAL LAYER ACCESS FOR NETWORK COMMUNICATIONS

TECHNICAL FIELD

This disclosure relates generally to communications between nodes in a network. More particularly, this disclosure relates to switching, by transmitting nodes and receiving nodes that support multiple physical (PHY) layer configurations in a network, to different communication modes according to a time-division schedule to transmit and receive data packets via the network.

BACKGROUND

In a network, infrastructure nodes (or simply "nodes"), such as endpoint devices, gateways, or routers, constantly communicate with each other to, for example, exchange messages or transmit data. Different nodes, however, may have different hardware and software configurations and thus may support different communication modes. In addition, each node may support multiple communication modes. A communication mode may indicate a particular data rate, a particular coding scheme, a particular modulation scheme, or a combination thereof, for a data transmission. For example, some nodes might be configured to support certain communication modes of orthogonal frequency-division multiplexing ("OFDM") while other nodes might be configured to support another set of OFDM communication modes. Some nodes might also be configured to support various communication modes based on frequency-shift keying ("FSK") instead of or in addition to OFDM. When transmitting data, a transmitting node may select a communication mode among the multiple supported communication modes in order to transmit the data to the receiving node reliably and efficiently.

In order for the receiving node to correctly receive and decode the received data, the receiving node needs to identify the communication mode used for transmitting the data and to switch to the correct communication mode. One current mode switching mechanism relies on a mode switch header prepended to a data packet to indicate the mode used by the transmitting node. Because the mode switch header is typically communicated in the base mode having a low data rate, transmitting the mode switch header can significantly reduce the efficiency of the transmission, especially for a communication mode that has a high data rate.

SUMMARY

Aspects and examples are disclosed for apparatuses and processes for network nodes switching between different communication modes according to a time-division schedule to transmit and receive data packets. In one example, a system includes a transmitting node and a receiving node. The transmitting node is configured to determine a scheduled communication mode of an upcoming time division according to a time-division schedule. The time-division schedule includes a plurality of cycles, each cycle including at least two time divisions and specifying respective scheduled communication modes for the at least two time divisions. The transmitting node is further configured to determine that the scheduled communication mode of the upcoming time division matches a selected communication mode from a plurality of supported communication modes by both the transmitting node and the receiving node. The selected communication mode is determined based on communication conditions of the transmitting node and the receiving node. The transmitting node is also configured to, in response to determining that the upcoming time division has arrived and becomes a current time division, generate and transmit a data packet to the receiving node using the scheduled communication mode. The receiving node is configured to operate in the scheduled communication mode specified for the current time division by the time-division schedule, while operating in the scheduled communication mode, determine that a preamble of the data packet is detected in the current time division, and in response to determining that the preamble of the data packet is detected, receive and process a remaining portion of the data packet in the scheduled communication mode.

In another example, a node of a network includes a processor configured to execute computer-readable instructions, and a memory configured to store the computer-readable instructions that, when executed by the processor, cause the processor to perform operations. The operations include operating in a first scheduled communication mode specified for a current time division by a time-division schedule. The time-division schedule includes a plurality of cycles, each cycle including at least two time divisions and specifying respective scheduled communication modes for the at least two time divisions. The first scheduled communication mode is one of a plurality of supported communication modes of the node. The operations further include while operating in the first scheduled communication mode, determining whether a signal of a data packet sent by a transmitting node is detected in the current time division, in response to determining that the signal of the data packet is detected, receiving a remaining portion of the data packet in the first scheduled communication mode; and in response to determining that no data packet is received during the current time division, switching to a second scheduled communication mode specified for a subsequent time division by the time-division schedule to receive data packets. The second scheduled communication mode is different from the first scheduled communication mode.

In yet another example, a method includes determining, by a node of a network, a scheduled communication mode of an upcoming time division according to a time-division schedule, wherein the time-division schedule includes a plurality of cycles, each cycle including at least two time divisions and specifying respective scheduled communication modes for the at least two time divisions. The method further includes determining, by the node, that the scheduled communication mode of the upcoming time division matches a selected communication mode from a plurality of supported communication modes by both the node and a receiving node. The selected communication mode is determined based on communication conditions of the transmitting node and the receiving node. The method further includes in response to determining that the upcoming time division has arrived and becomes a current time division, generating and transmitting, by the node, a data packet to the receiving node over the network using the scheduled communication mode.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
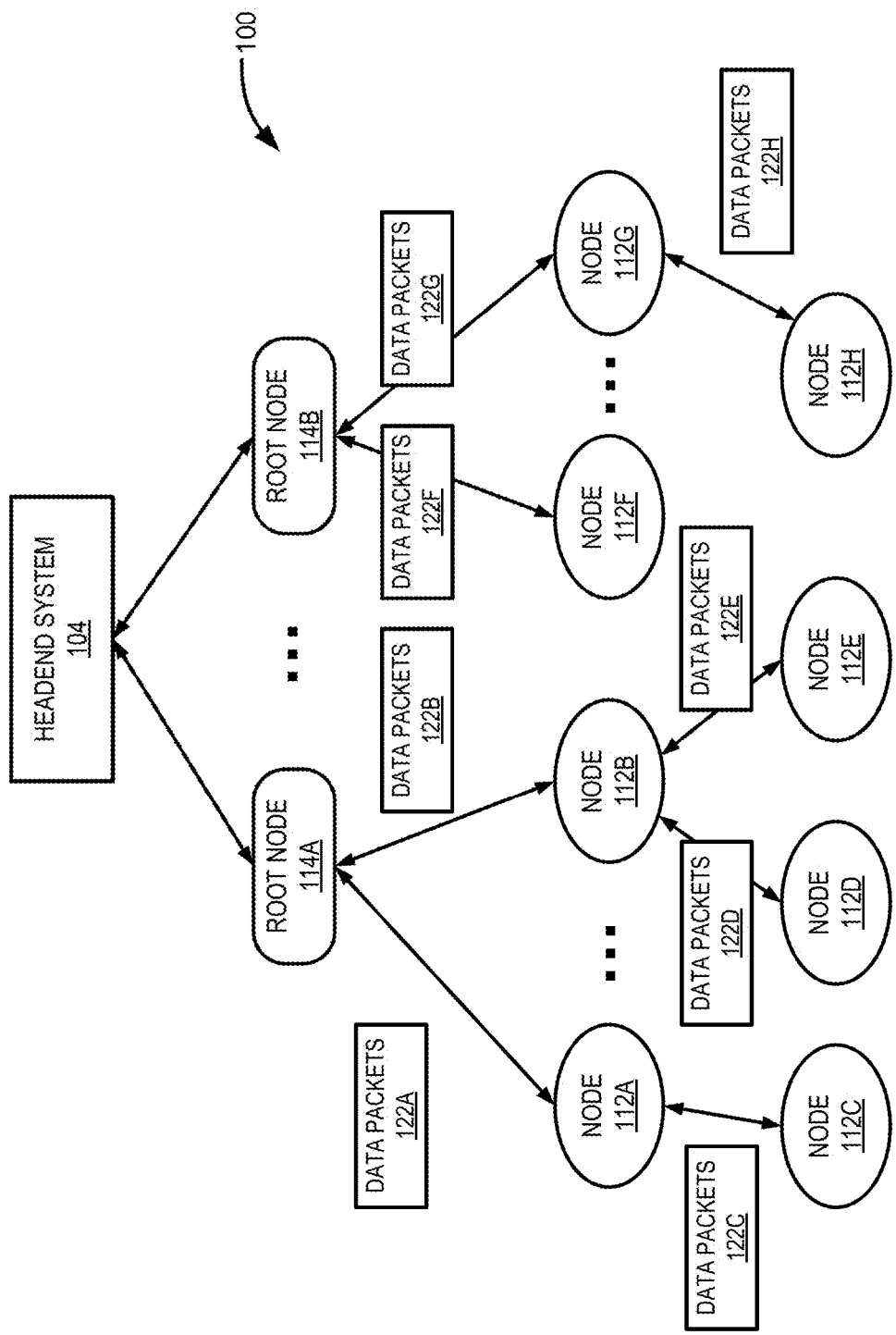
FIG. 1 is a block diagram showing an illustrative operating environment for switching between different communication modes according to a time-division schedule to transmit and receive data packets, according to certain aspects of the disclosure.

Systems and methods are provided for switching between different communication modes by network nodes according to a time-division schedule to transmit and receive data packets. Both the transmitting node and the receiving node switch to different communication modes according to a time-division schedule. The time-division schedule includes multiple cycles and each cycle contains at least two time divisions each indicating a communication mode for the corresponding time division. By following the time-division schedule, the transmitting node and the receiving node operate in the same communication mode at a given time. In this way, the communication modes of the transmitting node and the receiving node match with each other thereby eliminating the need for adding a mode switch header to indicate the communication mode when transmitting data packets.

For example, a transmitting node selects a communication mode among a set of supported communication modes and generates a data packet using the selected communication mode. Instead of inserting a mode switch header in the data packet to indicate the selected communication mode, the transmitting node transmits the data packet using the selected communication mode directly if the selected communication mode matches the communication mode indicated by the current time division. If the selected communication mode does not match the communication mode indicated by the current time division, the transmitting node waits until the time division whose communication mode matches the selected communication mode and transmits the data packet to the receiving node.

The receiving node operating in a communication mode according to the time-division schedule listens to traffic on the network. If the receiving node does not detect the preamble and header of a data packet in the current time division, the receiving node switches to a next communication mode specified for the next time division by the time-division schedule and listens to traffic in this new communication mode. If the receiving node detects a preamble and header of a data packet in the current time division, the receiving node continues to receive and process the data packet. In some examples, at least one of the time divisions has a communication mode set to be the base communication mode which is a mode in the set of supported communication modes that has the longest communication range. One or more other time divisions can have communication modes with a high data rate. In this way, the receiving node is able to detect traffic with the longest communication range for a period of time in each cycle and receive data at a higher data rate for the remaining time in the cycle.

Techniques described in the present disclosure increases the efficiency of the communication between nodes of a network. As discussed above, the mode switch header used in existing approaches may take a longer time to transmit than the payload because of the low data rate of the base mode used to communicate the mode switch header. The time-division-mode-switch mechanism described in the present disclosure, on the other hand, allows the data packets to be transmitted without using a mode switch header. As a result, the transmission efficiency (e.g. the ratio between the effective data rate and the payload data rate) can be significantly increased.

Furthermore, the time-division-mode-switch mechanism described in the present disclosure allows receiving nodes to operate in a base mode having the longest range of communication for at least a period of time in each cycle. This enables the receiving nodes to communicate with transmitting nodes far away thereby maximizing the communication range of the nodes. In the remaining time period of each cycle, the nodes can be configured to operate at a much higher bit rate than the base mode. This further increases the efficiency of communication.

FIG. 1 shows an illustrative network 100 in which nodes switch between different communication modes according to a time-division schedule to transmit and receive data packets, according to certain aspects of the disclosure. The network 100 shown in FIG. 1 includes multiple nodes 112A-112H (which may be referred to herein individually as a node 112 or collectively as the nodes 112). The network 100 can be a radio frequency (RF) mesh network (such as an IEEE 802.15.4 network), a Wi-Fi network, a cellular network, an Ethernet, a power line carrier network, or any other wired or wireless network. Correspondingly, the node 112 can be an RF radio, a computer, a mobile device, a power line network device, or another type of device that can directly communicate with other devices on the network 100.

In examples where the network 100 is a mesh network, the nodes 112 may include measuring nodes for collecting data from the respective deployed location of the nodes, processing nodes for processing data available to the nodes, router nodes for forwarding data received from one node to another node in the network 100, or nodes that are configured to perform a combination of these functions. The nodes 112 are further configured to communicate with each other so that messages or data can be exchanged between the nodes 112.

In one example, the network 100 can be associated with a resource distribution network, such as a utility network, to deliver measurement data obtained in the resource distribution network. In this example, the nodes 112 can include meters such as electricity meters, gas meters, water meters, steam meters, etc. and be implemented to measure various operating characteristics of the resource distribution network and to transmit the collected data through the network 100 to, for example, root nodes 114A and 114B (which may be referred to herein individually as a root node 114 or collectively as the root nodes 114).

Root nodes 114 of the network 100 may be configured for communicating with the nodes 112 to perform operations such as managing the nodes 112, collecting data from the nodes 112, and forwarding data to a headend system 104. A root node 114 can also be configured to function as a node to measure and process data itself. The root nodes 114 may be personal area network (PAN) coordinators, gateways, or any other devices capable of communicating with the headend system 104. The root nodes 114 ultimately transmit the generated and collected data to the headend system 104 via one or more additional networks (not shown in FIG. 1). The headend system 104 can function as a central processing system that receives streams of data or messages from the root node 114. The headend system 104 can process the collected data or have the collected data be processed for various applications.

In order for the nodes of the network 100 to communicate with each other, each node is configured to support one or more communication modes. For example, a node 112 may be configured to support FSK at various data rates. Another node may be configured to support both FSK and OFDM at different modulation and coding schemes (MCS) levels. Because different nodes of the network 100, including the nodes 112 and the root nodes 114, may be configured differently, their capabilities of supporting communication modes can be different. As such, each node in the network is configured with a common base mode of communication.

In some examples, the base mode is determined by the capabilities of the deployment. For example, a node deployment might contain some older, less capable nodes alongside newer, more capable nodes. In this case, the base mode for the network can be a mode that the older nodes can support, such as the FSK modulation. The newer OFDM capable nodes can use the FSK base mode for multicast messages and to initiate a mode switch operation. Further, in this deployment, a node can be assumed to have the minimum capabilities required to join the network and support the base node until positive confirmation from that node that it has enhanced capabilities is received. In one example, this information can be shared using an information element defined in the IEEE 802.15.4 standard. In further examples, the base mode of the nodes 112 is selected as a mode among the supported communication modes that has a longer range of communication than a majority of the supported communication modes, such as the mode with the longest range of communication.

In order for a pair of nodes to communicate with each other, the node that transmits data, also referred to herein as the "transmitting node," determines a communication mode so that data packets 122A, 122B, . . . or 122H can be successfully transmitted to the other node, also referred to herein as the "receiving node." The data packets 122A-122H may be referred to herein individually as a data packet 122 or collectively as the data packets 122. According to some aspects of the disclosure, the selected communication mode also can be used by the receiving node to successfully transmit acknowledgment packets back to the transmitting node to confirm that it has received the data packets 122. In some examples, the receiving nodes are diversity receivers that each supports multiple physical layer configurations. In order to correctly receive and process the data packets 122, the transmitting node and the receiving node switch between multiple supported communication modes according to the same time-division schedule. As a result, the transmitting node and the receiving node can directly communicate using the communication mode specified for the corresponding time division when the transmission occurs. Additional details regarding transmitting and receiving data packets using communication modes according to a time-division schedule are described below with regard to FIGS. 2-6.

It should be appreciated that the communication of data packets based on a time-division schedule described herein can be utilized by any nodes in the network 100, including the node 112, the root node 114, or any other nodes of the network 100 that are capable of communicating with other nodes of the network. In addition, while FIG. 1 depicts a specific network topology (e.g., a DODAG tree), other network topologies are also possible (e.g., a ring topology, a mesh topology, a star topology, etc.).

Figure 2:
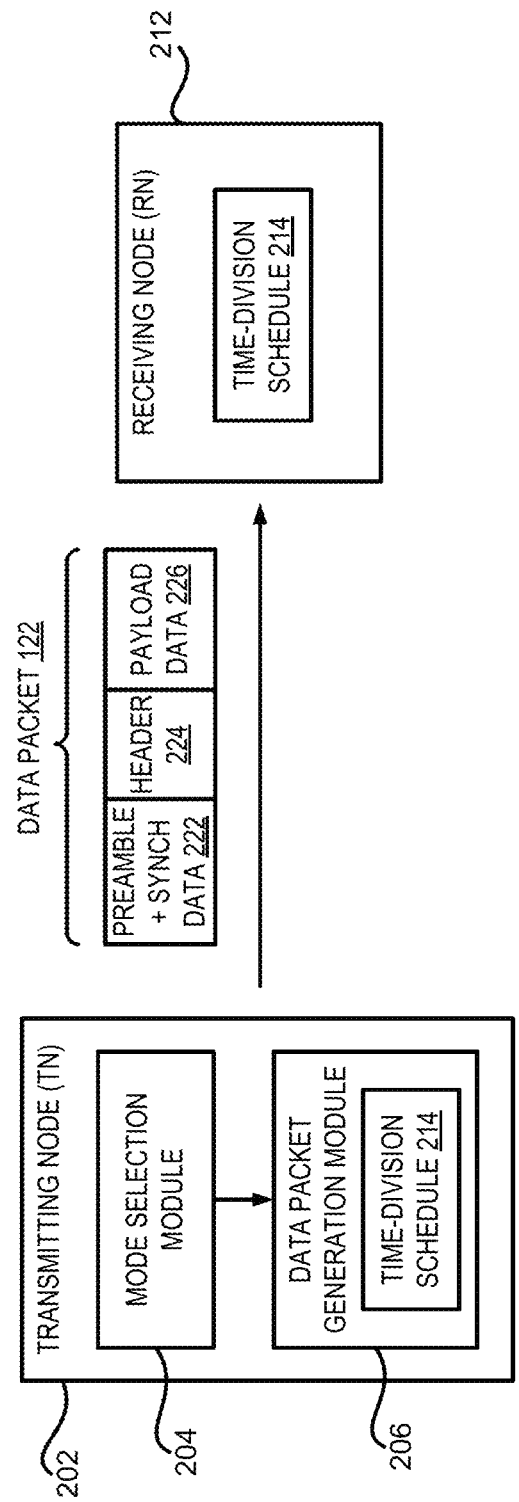
FIG. 2 is a diagram showing aspects of a transmitting node and a receiving node configured for transmitting and receiving data packets, respectively, by switching to different communication modes according to a time-division schedule, according to certain aspects of the disclosure.

Referring now to FIG. 2, FIG. 2 illustrates aspects of a transmitting node and a receiving node configured for transmitting and receiving data packets according to the carrier-sense multiple access (CSMA) protocol and based on a time-division schedule, according to certain aspects of the disclosure. In the example shown in FIG. 1, the transmitting node 202 can be a node 112, a root node 114, or any other node of the network 100 that is capable of communicating with another node in the network. The receiving node 212 is a neighbor of the transmitting node 202, i.e. any node in the network 100 that the transmitting node 202 can directly communicate with.

The transmitting node 202 can include a mode selection module 204 configured to select a communication mode so that the transmitting node 202 can successfully complete communication with the receiving node 212 using the selected communication mode. In some examples, the transmitting node 202 determines the communication mode based on the communication conditions of the transmitting node 202 and the receiving node 212. The communication conditions can be described using various factors including, but not limited to, the transmission power used for transmitting the data packets 122, the path loss between the transmitting node 202 and the receiving node 212 (i.e. the power attenuation of the transmitted signal as it propagates through the communication path), the SNR requirement at the receiving node 212, the noise floor observed at the receiving node 212, and so on.

The transmitting node 202 further includes a data packet generation module 206 configured to generate data packets 122 using the selected communication mode for communication with the receiving node 212. A data packet 122 generated by the data packet generation module 206 can include a preamble and synchronization data 222, a header 224, and payload data 226. The preamble and synchronization data 222 contain preamble signals followed by synchronization data that can be utilized by the receiving node 212 for purposes such as synchronization. The header 224 can include data such as data packet delimiter, physical layer header describing the length of the data unit, and so on. The payload data 226 include the actual intended message.

Figure 3:
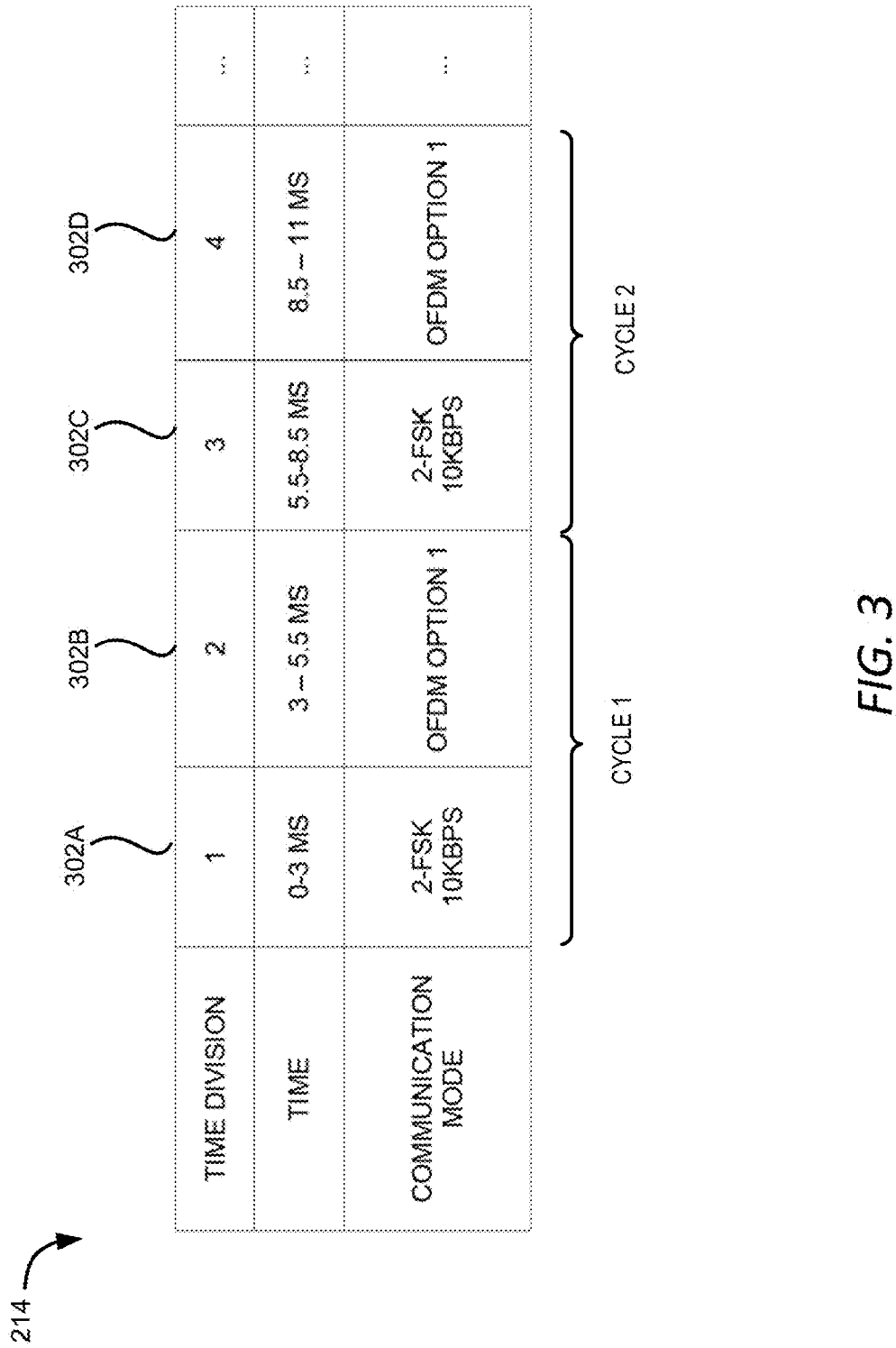
FIG. 3 is an example of a time-division schedule followed by nodes in a network for transmitting and receiving data packets, according to certain examples of the disclosure.

To transmit the data packet 122, the transmitting node 202 and the receiving node 212 follow a time-division schedule 214 for the communication modes of nodes 112 in the network 100. FIG. 3 shows an example of the time-division schedule 214. The time-division schedule 214 includes multiple time divisions and specifies a communication mode of the nodes 112 for each time division, also referred to herein as a "scheduled communication mode" for each time division. For example, during the first time division 302A (i.e., time 0 to 3 milliseconds), the nodes 112 in the network 100 should use the communication mode 2-FSK 10 kbps. During the next time division 302B (i.e., time 3-5.5 ms), the nodes 112 in the network 100 should use the communication mode OFDM Option 1 which supports data rates between 100 kbps and 2.4 Mbps. During the third time division 302C (i.e., time 5.5-8.5 ms), the communication mode switches back to 2-FSK 10 kbps. The following time divisions repeats the same pattern. It should be understood that 2-FSK and OFDM Option 1 are used as examples of the communication modes that can be included in the time division schedule 214 and should not be construed as limiting. Other communication modes can also be employed, such as IEEE 802.15.4 SUN O-QPSK.

As can be seen from the example shown in FIG. 3, the time-division schedule 214 has multiple cycles and each cycle includes two or more time divisions. In each cycle, the nodes 112 operates on different communication modes in different time divisions. The durations of the time divisions within a cycle may be the same or different. In some examples, the duration of a time division is determined based on the communication mode specified for that time division. For instance, the duration of a time division can be determined to be at least the sum of the time for a receiving node 212 to finish receiving the preamble, synchronization data, and the header, the time for the receiving node 212 to set up the communication mode, and the maximum time synchronization error.

According to this method, the duration for time division 1 shown in FIG. 3 can be determined as follows. If the time of receiving the preamble using the 2-FSK 10 kbps is 1.6 milliseconds, the setup time of the 2-FSK 10 kbps mode by the receiving node 212 is 0.36 milliseconds, and the maximum time synchronization error is 1 millisecond, the duration of the time division 1 is at least 1.6+0.36+1≈3 milliseconds. Likewise, for the time division 2, the time of receiving the preamble, synchronization data, and the header using the OFDM Option 1 is 1.08 millisecond, the setup time of the OFDM mode by the receiving node 212 is 0.29 millisecond, and the maximum time synchronization error is again 1 millisecond, the duration of the time division 2 is at least 1.08+0.29+1≈2.5 milliseconds. Although the time-division schedule 214 shows the durations of the time divisions to be the respective minimum time durations, each time division can have a duration longer than the respective minimum time durations.

Referring back to FIG. 2, the transmitting node 202 transmits the generated data packet 122 to the receiving node 212 using the communication mode of the current time division. If the communication mode of the current time division does not match the selected communication mode determined by the mode selection module 204, the transmitting node 202 can, for example, wait until a future time division whose communication mode matches the selected communication mode. For example, if the selected communication mode by the mode selection module is OFDM Option 1 and the communication mode of the current time division is 2-FSK 10 kbps, the transmitting node 202 can wait until the next time division whose communication mode is OFDM Option 1 to start the transmission of the data packet 122 in that communication mode.

As discussed above, the receiving node 212 also switches between communication modes according to the time-division schedule 214. At a given time, the receiving node 212 operates in the communication mode of the current time division to listen to traffic in the network 100. If the receiving node 212 does not detect the preamble and synchronization data 222 and the header 224 of a data packet 122 within the current time division, then the receiving node 212 switches to the communication mode of the next time division and continues to listen to traffic on the network 100. If in the current time division, the receiving node 212 detects the preamble and synchronization data 222 and the header 224 of a data packet 122, the receiving node 212 continues to receive the remaining data in the data packet 122 including the payload data 226 using the current communication mode. When the receiving node 212 finishes receiving the data packet 122, the data packet 122 determines the current time division based on the time-division schedule 214 and switches to the communication mode specified for the current time division to listen to network traffic.

Figure 4A:
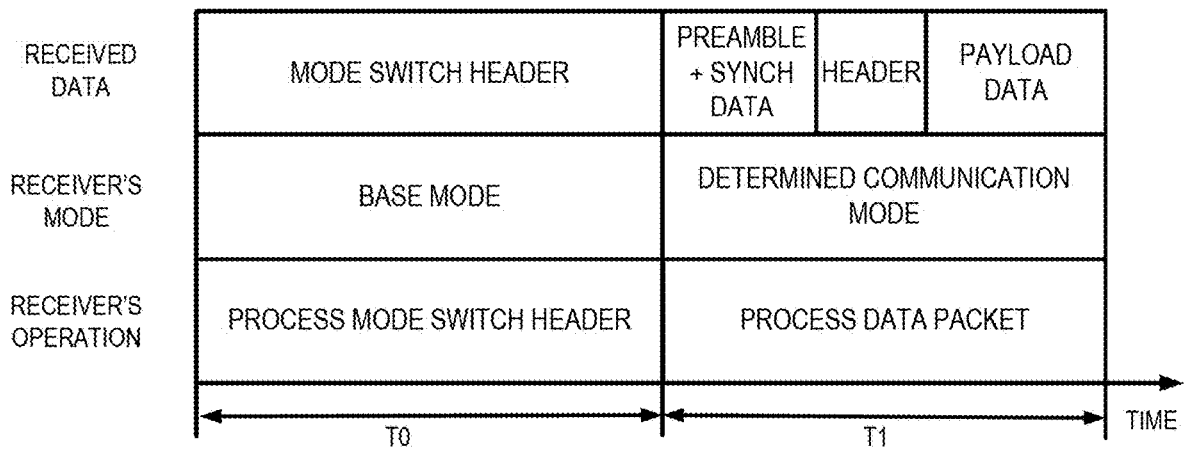
FIG. 4A is a diagram illustrating an example of the data packet received at a receiving node, the communication mode of the receiving node, and the operations performed by the receiving node, according to a prior art mode switch mechanism.
Figure 4B:
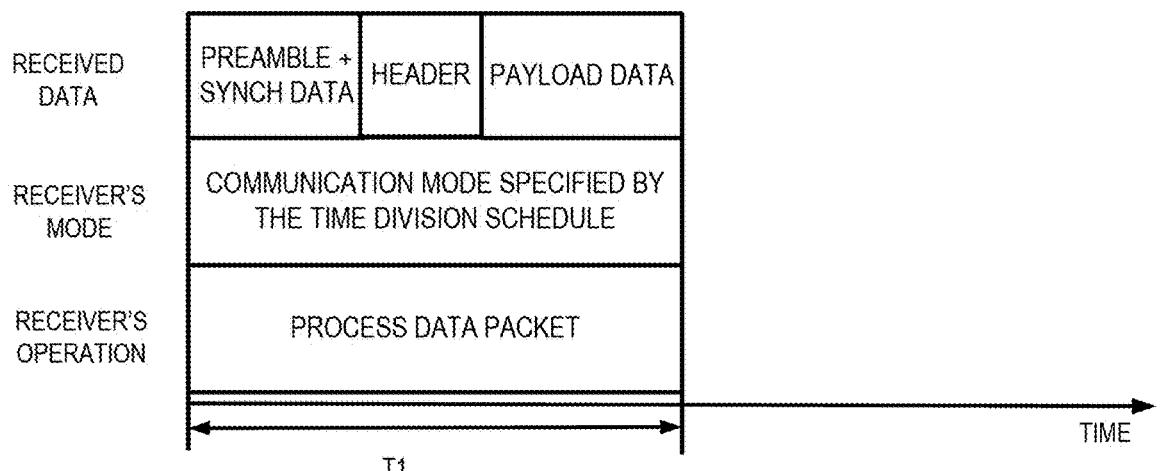
FIG. 4B is a diagram illustrating an example of the data packet received at a receiving node, the communication mode of the receiving node, and the operations performed by the receiving node based on the time-division schedule, according to certain aspects of the disclosure.

Referring now to FIGS. 4A and 4B, where the standard IEEE 802.15.4 mode switch mechanism and the time-division-mode-switch mechanism presented herein are compared. FIG. 4A shows a diagram illustrating an example of the data received at a receiving node, the mode of the receiving node, and the operations performed by the receiving node at different time periods, according to the standard IEEE 802.15.4 mode switch communication mechanism. FIG. 4B shows the data received at a receiving node, the mode of the receiving node, and the operations performed by the receiving node based on the time-division schedule, according to certain aspects of the disclosure.

The standard IEEE 802.15.4 mode switch mechanism shown in FIG. 4A employs a mode switch header added in each data packet to communicate the communication mode selected by a transmitting node. As such, during the overhead time period TO when the communication mode is detected, the receiving node using the standard IEEE 802.15.4 mode switch mechanism receives the mode switch header by operating in the base mode and then processes the mode switch header to find out the communication mode used by the transmitting node. After the communication mode is determined, the receiving node switches to the determined communication mode to receive and process the preamble and synchronization data, the header, and the rest of the data in the data packet. The receiving node returns to the base mode after this communication.

In comparison, in the time-division-mode-switch mechanism presented herein, because the receiving node 212 operates on the same time-division schedule 214 as the transmitting node 202, the communication modes of the receiving node 212 and the transmitting node 202 are synchronized (omitting the synchronization error between the receiving node 212 and the transmitting node 202). As such, when the transmitting node 202 transmits the data packet 122, the communication modes of the transmitting node 202 and the receiving node 212 are the same. As a result, the receiving node 212 can directly receive the data packet 122 without determining the communication mode of the data packet 122 beforehand. This eliminates the overhead time period TO in the standard IEEE 802.15.4 mode switch mechanism. As a result, the communication efficiency can be significantly improved by the techniques proposed herein.

In some cases, however, the selected communication mode by the transmitting node 202 might not match any of the communication modes specified in the time-division schedule 214. For instance, the selected communication mode is 2-FSK 100 kbps, which is different from all the communication modes specified in the time-division schedule 214 shown in FIG. 3. In that case, the transmitting node 202 can use the mode switch header mechanism to signal the selected communication mode to the receiving node 212. More specifically, the transmitting node 202, while operating in the communication mode specified by the time-division schedule 214 for the current time division, such as 2-FSK 10 kbps mode, can generate and transmit a mode switch header to indicate the selected communication mode. Afterward, the transmitting node 202 can switch to the selected communication mode and transmit the rest of the data packet 122 in the selected communication mode.

Figure 4C:
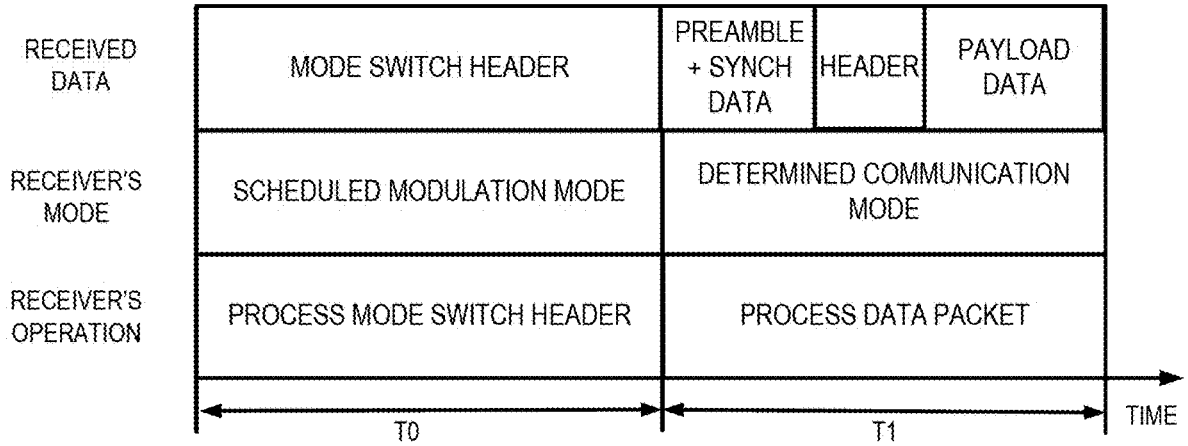
FIG. 4C is a diagram illustrating an example of the data packet received at a receiving node, the communication mode of the receiving node, and the operations performed by the receiving node when the communication mode specified by the time-division schedule does not match the selected communication mode, according to certain aspects of the disclosure.

The receiving node 212, while operating in the communication mode scheduled for the current time division, can receive the mode switch header and determine the selected communication mode for the data packet 122. Once the selected communication mode is determined, the receiving node 212 can switch to the selected communication mode to receive and process the data packet 122. This scenario is illustrated in FIG. 4C. Although the communication efficiency of the scenario in FIG. 4C is similar to that of the standard IEEE 802.15.4 mode switch mechanism shown in FIG. 4A, this scenario only occurs when the selected communication mode by the transmitting node 202 does not match the communication modes specified in the time-division schedule 214. Therefore, the overall communication efficiency of the proposed technique is still much higher than the standard IEEE 802.15.4 mode switch mechanism.

Figure 5:
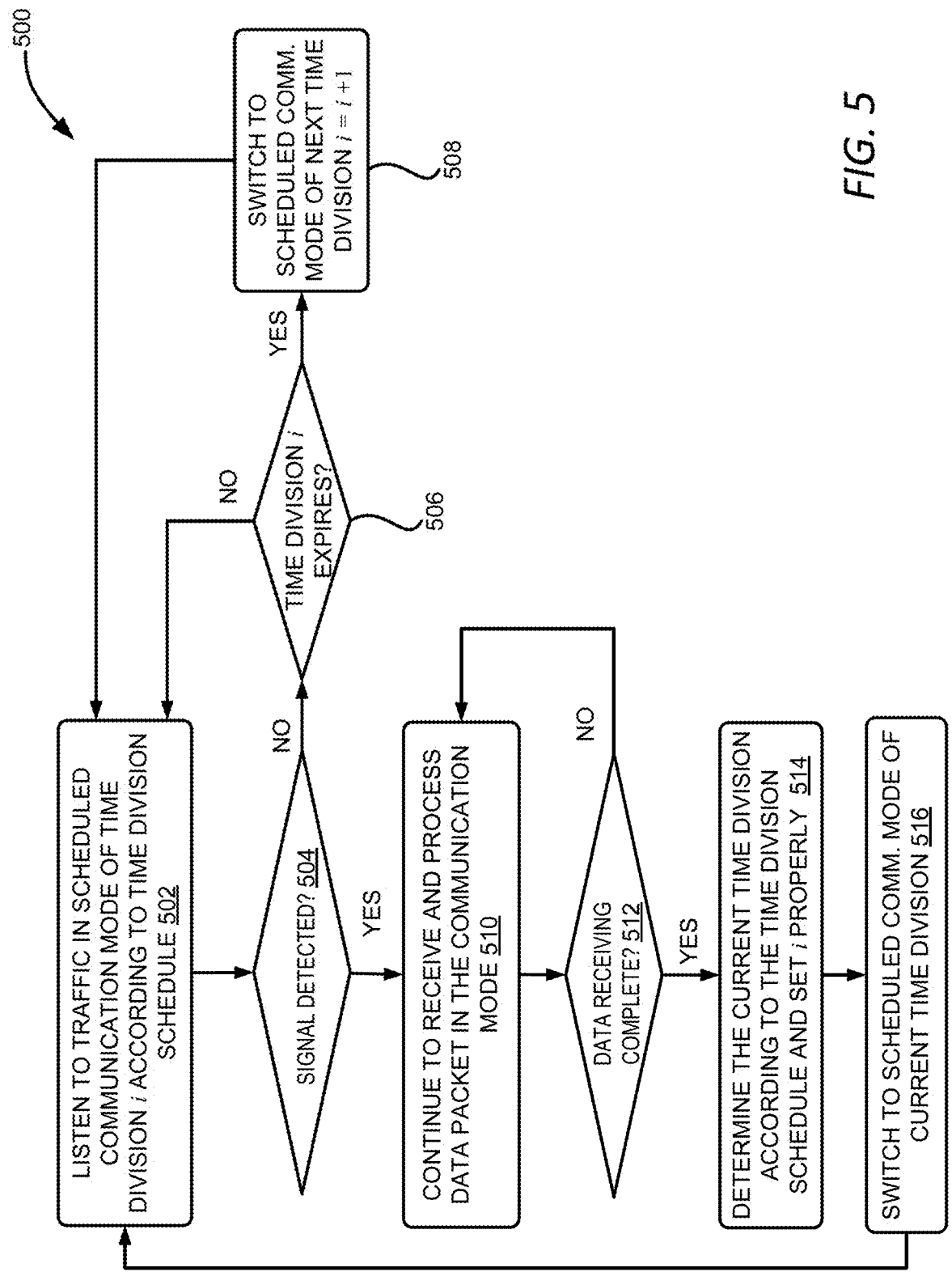
FIG. 5 is an example of a process for receiving and processing data packets transmitted by a transmitting node, according to certain aspects of the disclosure.

FIG. 5 is an example of a process 500 for receiving and processing data packets by a receiving node, according to certain aspects of the disclosure. One or more nodes of the network 100 (e.g., the node 112 or the root node 114) implement operations depicted in FIG. 5 by executing suitable program code when operating as receiving nodes. For illustrative purposes, process 500 is described with reference to certain examples depicted in the figures. Other implementations, however, are possible.

At block 502, process 500 involves the receiving node 212 listening to incoming traffic in a scheduled communication mode of the current time division (with a division index i) according to the time-division schedule 214. At block 504, process 500 involves the receiving node 212 determining if the packet signal is detected. Depending on the communication mode, the receiving node 212 can determine that a signal is detected based on the detection of the preamble, synchronization data, and/or the header. For example, if the current scheduled communication mode is an FSK mode, the receiving node 212 can determine that a signal is detected when the preamble of the data packet is detected. If the current scheduled communication mode is an OFDM mode, the receiving node 212 can determine that a signal is detected when the preamble, synchronization data, and the header of the data packet are detected. In other examples, the receiving node 212 can determine that a signal is detected if the preamble or synchronization data of the data packet is detected when the current scheduled communication mode is an OFDM mode. If the receiving node 212 determines that the packet signal is not detected, the process 500 proceeds to block 506 to determine if the current time division i expires. If not, the transmitting node 202 continues to listen to the incoming traffic in the scheduled communication mode. If, at block 506, the receiving node 212 determines that the current time division expires, the process 500 involves switching to the scheduled communication mode of the next time division and increase the time-division index i by 1. The receiving node 212 then continues to listen to incoming traffic using the new scheduled communication mode.

If, at block 504, the receiving node 212 determines that the packet signal is detected, the process 500 proceeds to block 510. At block 510, the receiving node 212 continues to receive the rest of the data packet 122 in the current scheduled communication mode. This receiving process may span multiple time divisions. At block 512, process 500 involves the receiving node 212 determining whether the data receiving is complete. If not, the receiving node 212 continues to receive the data packet 122 at block 510. If the receiving is complete, process 500 involves the receiving node 212 determining, at block 514, the current time division according to the time-division schedule 214 and set the time-division index i accordingly. The process 500 then involves the receiving node 212 switching to the scheduled communication mode of the current time division at block 516, and listen to the incoming traffic using that mode at block 502.

Figure 6:
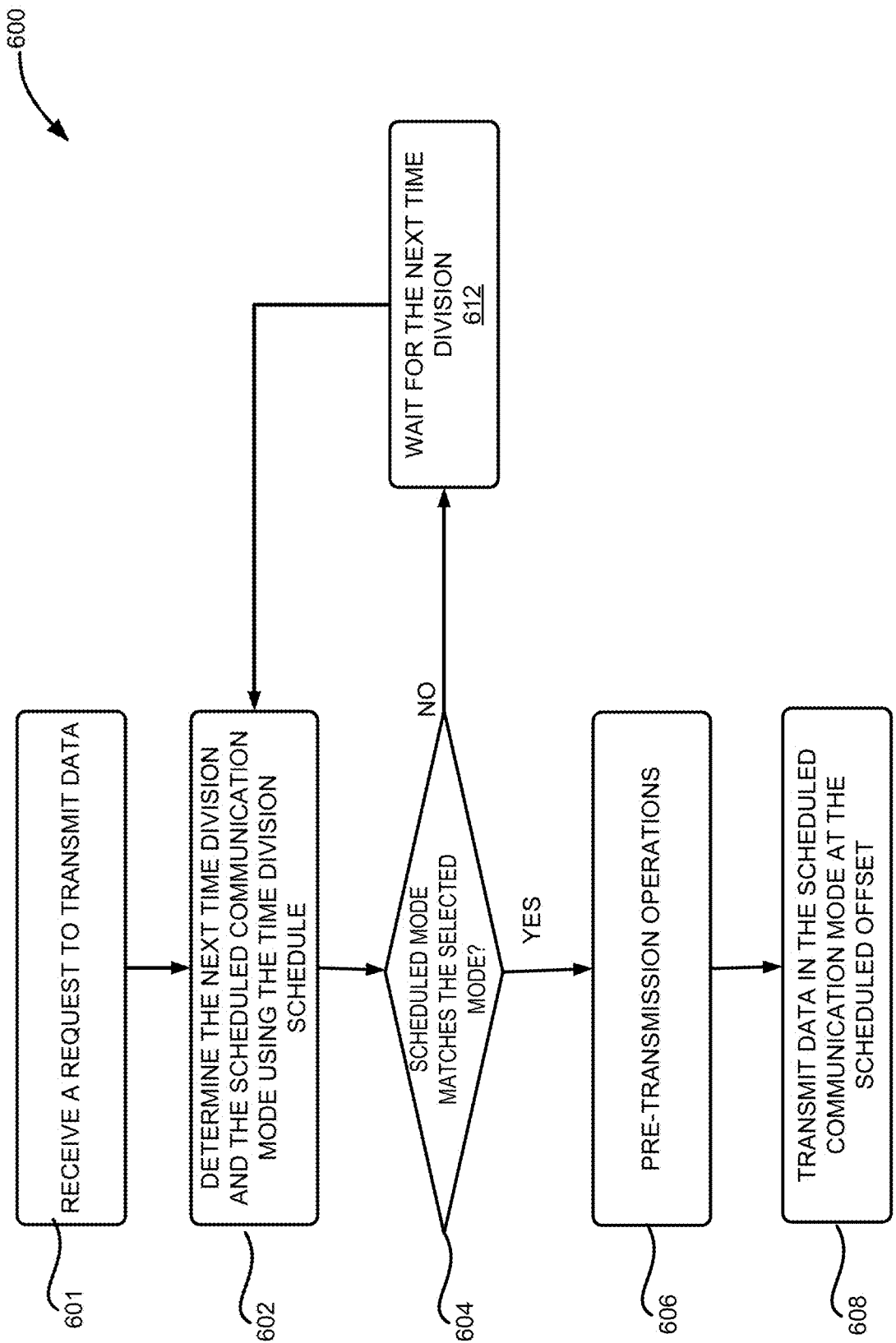
FIG. 6 is an example of a process for transmitting data packets by following a time-division schedule, according to certain aspects of the disclosure.

Turning now to FIG. 6, an example of a process 600 for transmitting data packets by following a time-division schedule is presented. One or more nodes of the network 100 (e.g., the node 112 or the root node 114) implement operations depicted in FIG. 6 by executing suitable program code when operating as transmitting nodes. For illustrative purposes, the process 600 is described with reference to certain examples depicted in the figures. Other implementations, however, are possible.

At block 601, the process 600 involves the transmitting node 202 receiving a request to transmit data. At block 602, the process 600 involves the transmitting node 202 determining the upcoming time division based on the time-division schedule 214. At block 604, the process 600 involves the transmitting node 202 determining whether the scheduled communication mode for the upcoming time division matches the selected communication mode for the data packet 122. As described above in detail with respect to FIG. 2, the transmitting node 202 can use a mode selection module 204 to determine the transmission mode of the data packet 122 based on the communication conditions of the transmitting node 202 and the receiving node 212. If the scheduled communication mode does not match the selected communication mode, the transmitting node 202, at block 612, waits for the next time division and repeats the operations in block 602 to determine the scheduled communication mode for the upcoming time division.

If at block 604, the transmitting node 202 determines that the scheduled upcoming communication mode matches the selected communication mode, the process 600 involves, at block 606, the transmitting node 202 performing pre-transmission operations. These operations include, for example, performing a clear channel assessment (CCA) to determine whether the channel is available for transmission. The pre-transmission operations may also include other operations that need to be performed by the transmitting node 202 before starting to transmit a data packet. At block 608, the process 600 involves transmitting data using the scheduled communication mode when the upcoming time division has arrived (i.e., the time for entering into the upcoming time division has arrived). The transmission may include setting up for transmission using the scheduled communication mode and waiting for a maximum time synchronization error period. Nodes 112 in the network 100 synchronize their clocks from time to time. However, synchronization errors may occur leading to the clocks of the nodes 112 have certain offsets from each other. The maximum time synchronization error period represents the maximum time period of the synchronization errors between the nodes 112. Waiting for a maximum time synchronization error period allows the receiving node 212 to be in the right communication mode when the data packet 122 is being transmitted even if there is a synchronization error between the transmitting node 202 and the receiving node 212. The transmitting node 202 then transmits the data packet 122 in the scheduled communication mode of the current time division.

Although FIG. 6 shows that the transmitting node 202 waits for the next time division when the scheduled communication mode does not match the selected communication mode, in other examples, the transmitting node 202 may use the scheduled communicate mode for transmission even if it does not match the selected communication mode. For example, if both the transmitting node and the receiving node support the scheduled communication mode, the transmitting node could choose to transmit in the upcoming time division, rather than waiting for the next matching time division, if doing is faster. In this way, the wait time is avoided.

Note that the example process shown in FIG. 6 may be employed when the selected communication mode matches at least one scheduled communication mode in the time-division schedule 214. In cases when the selected communication mode does not match any of the scheduled communication modes in the time-division schedule 214, the transmitting node 202 can use the switch header as discussed above to indicate the selected communication mode.

It should be understood that the time-division schedule 214 shown in FIG. 3 is for illustration purposes only and should not be construed as limiting. Various other ways to build the time-division schedule 214 can be utilized. For example, the time-division schedule 214 can have more than two time divisions in a cycle. At least one communication mode in the time-division schedule 214 is set to be the base mode or another long-range low-data-rate mode. At least one communication mode in the time-division schedule 214 is set to be a communication mode with one of the highest data rates. In some implementations, the communication modes included in the time-division schedule 214 can be determined based on the communication modes used by the nodes 112 in the network 100. For instance, the time-division schedule 214 can be configured to include communication modes that were used often by the nodes 112 based on past communications. In addition, the time-division mode switch mechanism presented herein can be implemented with the CSMA media access control (MAC) protocol or other MAC protocols, such as Time Synchronized Channel Hopping (TSCH) protocol.

In some scenarios, not all the nodes 112 on the network 100 implement the time-division-mode-switch mechanism described herein. In these scenarios, the nodes 112 that do not implement the time-division-mode-switch mechanism (also referred to as non-compliant nodes) may not be aware of the time-division schedule 214 and instead rely on the mode switch header to signal the selected communication mode to the receiving nodes in the network 100. This also include the scenarios when nodes that implement the time-division-mode-switch mechanism (also referred to as compliant nodes) initially join the network and have not obtained the time division schedule 214. In order for the compliant nodes 112 to be able to communicate with the non-compliant nodes, the preamble of the data packet 122 can be increased to be long enough to include a complete preamble detection period no matter where the receiving compliant node is operating within a cycle of the time-division schedule 214 when the preamble is being transmitted. For example, the duration of the preamble can be determined to be at least a cycle of the time division schedule 214 plus the time period for detecting the preamble of a data packet in the based mode. In this way, the compliant nodes, when receiving data packets 122 from the non-compliant nodes, can detect the preamble and thus the mode switch header and determine the selected communication mode for the data packets 122. In another example, the length of the preamble can be configured to be close to but shorter than one cycle of the time-division schedule 214, such as 90%. This setting can be used along with the retry mechanism of the communication protocol to allow the receiving node to receive the preamble and determine the correct communication mode.

Exemplary Node

Figure 7:
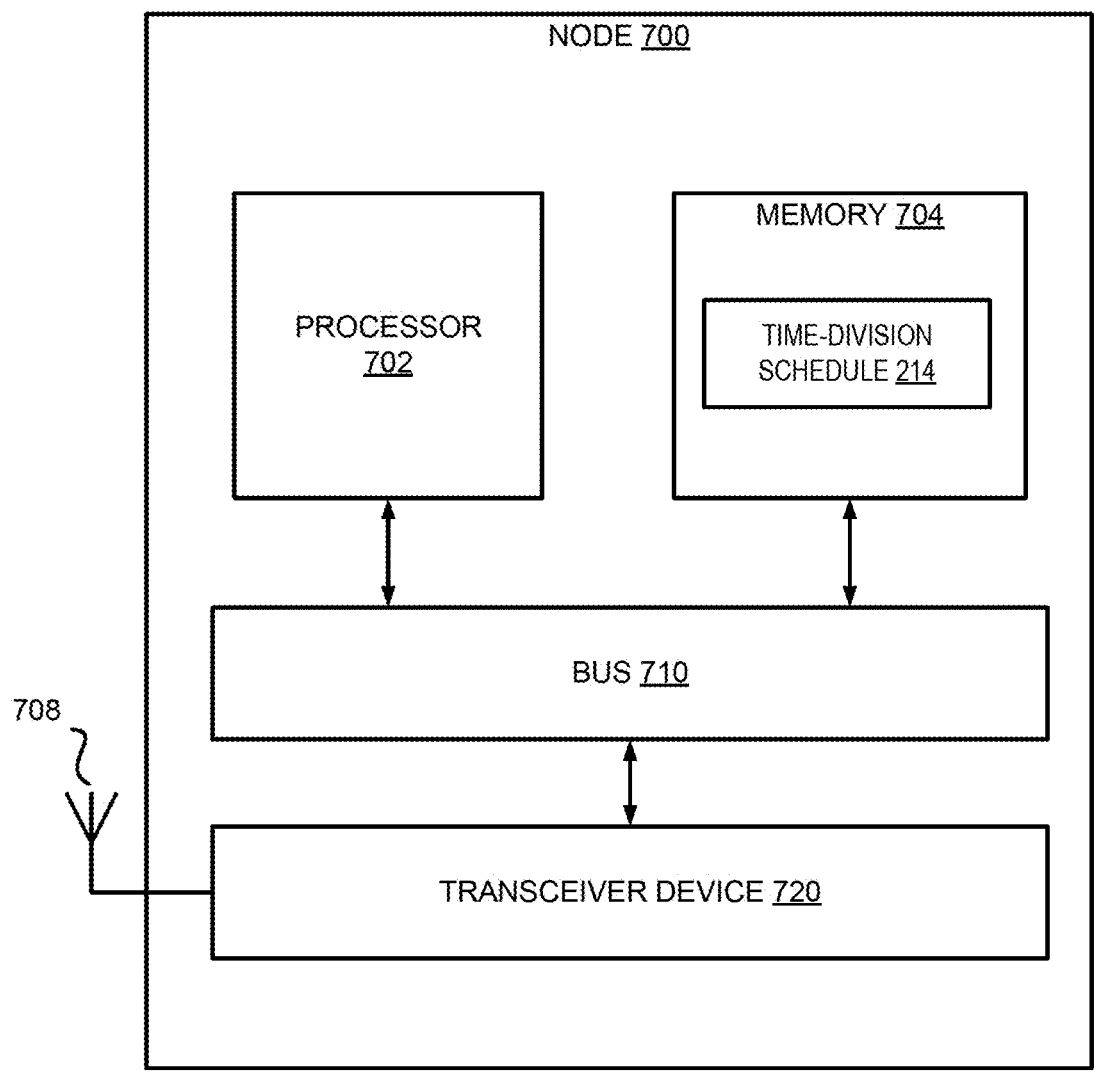
FIG. 7 is a block diagram depicting an example of a computing system suitable for implementing aspects of the techniques and technologies presented herein.

FIG. 7 illustrates an exemplary node 700 that can be employed to implement the mode switch mechanism described herein, such as a node 112 or a root node 114. The node 700 may include a processor 702, memory 704, and a transceiver device 720 each communicatively coupled via a bus 710. The components of node 700 can be powered by an A/C power supply or a low energy source, such as a battery (not shown). The transceiver device 720 can include (or be communicatively coupled to) an antenna 708 for communicating with other nodes. In some examples, the transceiver device is a radio-frequency ("RF") transceiver for wirelessly transmitting and receiving signals.

The processor may include a microprocessor, an application-specific integrated circuit ("ASIC"), a state machine, a field programmable gate array ("FPGA") or other suitable computing device. The processor can include any number of computing devices and can be communicatively coupled to a computer-readable media, such as memory 704. The processor 702 can execute computer-executable program instructions or access information stored in memory to perform operations, such as the time-division schedule 214 described herein. The instructions may comprise processor-specific instructions generated by a compiler and/or an interpreter from code written in any suitable computer-programming language. When instructions are executed, they may configure the node 700 to perform any of the operations described herein. Although the processor, memory, bus, and transceiver device are depicted in FIG. 7 as separate components in communication with one another, other implementations are possible. The systems and components discussed herein are not limited to any particular hardware architecture or configuration.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system, comprising:
   a transmitting node configured to:
      determine a scheduled communication mode of an upcoming time division according to a time-division schedule, wherein the time-division schedule comprises a plurality of cycles, each cycle comprising at least two time divisions and specifying respective scheduled communication modes for the at least two time divisions;
      determine that the scheduled communication mode of the upcoming time division matches a selected communication mode from a plurality of supported communication modes by both the transmitting node and a receiving node, the selected communication mode being determined based on communication conditions of the transmitting node and the receiving node;
      in response to determining that the upcoming time division has arrived and becomes a current time division, generate and transmit a data packet to the receiving node using the scheduled communication mode;
      determine that the selected communication mode is different from any scheduled communication mode in the time-division schedule;
      generate and transmit a mode switch header in the scheduled communication mode of the current time division to indicate the selected communication mode; and
      transmit the data packet in the selected communication mode; and
   the receiving node configured to:
      operate in the scheduled communication mode specified for the current time division by the time-division schedule;
      while operating in the scheduled communication mode, determine that a preamble of the data packet is detected in the current time division; and
      based, at least in part, upon determining that the preamble of the data packet is detected, receive and process a remaining portion of the data packet in the scheduled communication mode.

2. The system of claim 1, wherein the receiving node is further configured to:
   determine that no data packet is received during a given time division; and
   switch to a second scheduled communication mode specified for a subsequent time division by the time-division schedule to detect data packet in the subsequent time division, wherein the second scheduled communication mode is different from the first scheduled communication mode.

3. The system of claim 1, wherein transmitting the data packet to the receiving node comprises waiting for a period of time determined according to a maximum time synchronization error period and sending the data packet to the receiving node.

4. The system of claim 1, wherein the transmitting node is further configured to perform a clear channel assessment (CCA) prior to transmitting the data packet to the receiving node.

5. The system of claim 1, wherein one of the scheduled communication modes is a base mode of the receiving node, and the base mode comprises one of the plurality of supported communication modes that has a longer range of communication than a majority of the plurality of supported communication modes.

6. The system of claim 1, wherein the receiving node is further configured to:
   detect the mode switch header while operating in the scheduled communication mode to determine the selected communication mode;
   switch to the selected communication mode; and
   receive and process the data packet in the selected communication mode.

7. The system of claim 1, wherein the plurality of supported communication modes comprise one or more frequency-shift keying (FSK) communication modes or one or more orthogonal frequency-division multiplexing (OFDM) communication modes.

8. A node of a network, comprising:
   a processor configured to execute computer-readable instructions; and
   a memory configured to store the computer-readable instructions that, when executed by the processor, cause the processor to perform operations comprising:

operating in a first scheduled communication mode specified for a current time division by a time-division schedule, wherein the time-division schedule comprises a plurality of cycles, each cycle comprising at least two time divisions and specifying respective scheduled communication modes for the at least two time divisions, and wherein the first scheduled communication mode is one of a plurality of supported communication modes of the node;

while operating in the first scheduled communication mode, determining whether a signal of a data packet sent by a transmitting node is detected in the current time division;

in response to determining that the signal of the data packet is detected, receiving a remaining portion of the data packet in the first scheduled communication mode; and in response to determining that no data packet is received during the current time division, switching to a second scheduled communication mode specified for a subsequent time division by the time-division schedule to receive data packets, wherein the second scheduled communication mode is different from the first scheduled communication mode;

detecting a mode switch header of a data packet while operating in the first scheduled communication mode to determine a selected communication mode;

switching to the selected communication mode; and receiving and process the data packet in the selected communication mode, wherein the data packet is transmitted by the transmitting node responsive to determining that the selected communication mode is different from any scheduled communication mode in the time-division schedule.

9. The node of claim 8, wherein the data packet is transmitted by the transmitting node based on a selected communication mode for the data packet matching the first scheduled communication mode specified for the current time division by the time-division schedule.

10. The node of claim 8, wherein one of the scheduled communication modes is a base mode of the node, and the base mode comprises one of the plurality of supported communication modes that has a longer range of communication than a majority of the plurality of supported communication modes.

11. The node of claim 8, wherein determining that the signal of the data packet is detected comprises determining that a preamble of the data packet is detected or determining that both the preamble and a header of the data packet are detected.

12. The node of claim 8, wherein the plurality of supported communication modes comprise one or more frequency-shift keying (FSK) communication modes or one or more orthogonal frequency-division multiplexing (OFDM) communication modes.

13. A method, comprising:
determining, by a node of a network, a scheduled communication mode of an upcoming time division according to a time-division schedule, wherein the time-division schedule comprises a plurality of cycles, each cycle comprising at least two time divisions and specifying respective scheduled communication modes for the at least two time divisions;

determining, by the node, that the scheduled communication mode of the upcoming time division matches a selected communication mode from a plurality of supported communication modes by both the node and a receiving node, the selected communication mode being determined based on communication conditions of the transmitting node and the receiving node;

in response to determining that the upcoming time division has arrived and becomes a current time division, generating and transmitting, by the node, a data packet to the receiving node over the network using the scheduled communication mode;

determining that the selected communication mode is different from any scheduled communication mode in the time-division schedule;

generating and transmit a mode switch header in the scheduled communication mode of the current time division to indicate the selected communication mode; and transmitting the data packet in the selected communication mode.

14. The method of claim 13, wherein transmitting the data packet to the receiving node comprises waiting for a period of time determined according to a maximum time synchronization error period and sending the data packet to the receiving node.

15. The method of claim 13, further comprising performing a clear channel assessment (CCA) prior to transmitting the data packet to the receiving node.

16. The method of claim 13, wherein one of the scheduled communication modes is a base mode of the receiving node, and the base mode comprises one of the plurality of supported communication modes that has a longer range of communication than a majority of the plurality of supported communication modes.

17. The method of claim 13, wherein the plurality of supported communication modes comprise one or more frequency-shift keying (FSK) communication modes or one or more orthogonal frequency-division multiplexing (OFDM) communication modes.

* * * * *